United States Patent
Pfeifer et al.

(10) Patent No.: US 8,926,932 B2
(45) Date of Patent: Jan. 6, 2015

(54) HIGH SURFACE AREA CARBON AND PROCESS FOR ITS PRODUCTION

(75) Inventors: Peter Pfeifer, Columbia, MO (US); Galen J. Suppes, Columbia, MO (US); Parag Shah, Ames, IA (US); Jacob W. Burress, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 305 days.

(21) Appl. No.: 11/937,150

(22) Filed: Nov. 8, 2007

(65) Prior Publication Data

US 2008/0207442 A1   Aug. 28, 2008

Related U.S. Application Data

(60) Provisional application No. 60/857,554, filed on Nov. 8, 2006.

(51) Int. Cl.
*C01B 21/02* (2006.01)
*C01B 21/00* (2006.01)
(Continued)

(52) U.S. Cl.
CPC .............. *B01J 20/3064* (2013.01); *B01J 20/00* (2013.01); *B01J 20/20* (2013.01); *B01J 20/28057* (2013.01); *B01J 20/28083* (2013.01); *B01J 20/28085* (2013.01); *B01J 21/18* (2013.01); *B82Y 30/00* (2013.01); *C01B 3/0021* (2013.01); *C01B 31/08* (2013.01); *C01B 31/12* (2013.01); *C04B 38/0022* (2013.01); *C04B 2111/00853* (2013.01); *C04B 2111/00948* (2013.01); *C10L 3/10* (2013.01); *F17C 11/005* (2013.01); *F17C 11/007* (2013.01); *H01G 11/34* (2013.01); *H01M 4/926* (2013.01); *H01M 8/04216* (2013.01); *Y02C 20/20* (2013.01); *Y02E 60/321* (2013.01); *Y02E 60/325* (2013.01); *Y02E 60/50* (2013.01); *Y02E 60/13* (2013.01); *Y02E 60/327* (2013.01); *Y02E 60/328* (2013.01); *H01G 11/24* (2013.01); *Y02T 10/7022* (2013.01)
USPC .............. 423/445 R; 423/445; 423/447.1; 423/447.2; 423/460; 252/502; 502/418; 502/180; 502/400; 502/404; 502/413

(58) Field of Classification Search
None
See application file for complete search history.

(56) References Cited

U.S. PATENT DOCUMENTS 1,565,328 A * 12/1925 Ray .................. 502/416
3,454,502 A    7/1969 Hiltgen et al.
(Continued)

FOREIGN PATENT DOCUMENTS

JP     07-232908 A    5/1995
JP     07-232908 H    5/1995
WO    2008/058231 A2  5/2008

OTHER PUBLICATIONS

Guerreiro et al.; Estimation of Surface and Pore Volume of Activated Carbon by Methylene Blue and Iodine Numbers; Quim, Nova, vol. 34, No. 3, 472-476, 2011.*

(Continued)

*Primary Examiner* — Guinever Gregorio
(74) *Attorney, Agent, or Firm* — Polsinelli PC

(57) ABSTRACT

The present invention provides a high surface area porous carbon material and a process for making this material. In particular, the carbon material is derived from biomass and has large mesopore and micropore surfaces that promote improved adsorption of materials and gas storage capabilities.

2 Claims, 10 Drawing Sheets

(51) Int. Cl.
| | |
|---|---|
| *D01F 9/12* | (2006.01) |
| *C09C 1/56* | (2006.01) |
| *H01B 1/04* | (2006.01) |
| *C01B 31/08* | (2006.01) |
| *B01J 31/00* | (2006.01) |
| *B01J 20/00* | (2006.01) |
| *B01J 20/20* | (2006.01) |
| *B01J 20/30* | (2006.01) |
| *B01J 20/28* | (2006.01) |
| *B01J 21/18* | (2006.01) |
| *B82Y 30/00* | (2011.01) |
| *C01B 3/00* | (2006.01) |
| *C01B 31/12* | (2006.01) |
| *C04B 38/00* | (2006.01) |
| *C10L 3/10* | (2006.01) |
| *F17C 11/00* | (2006.01) |
| *H01G 11/34* | (2013.01) |
| *H01M 4/92* | (2006.01) |
| *H01G 11/24* | (2013.01) |
| *C04B 111/00* | (2006.01) |
| *H01M 8/04* | (2006.01) |

(56) References Cited

U.S. PATENT DOCUMENTS

| | | | |
|---|---|---|---|
| 4,038,301 A | | 7/1977 | Otto |
| 4,082,694 A | * | 4/1978 | Wennerberg et al. ......... 502/427 |
| 4,476,242 A | | 10/1984 | Puskas et al. |
| 4,954,469 A | * | 9/1990 | Robinson ......................... 502/80 |
| 4,970,189 A | * | 11/1990 | Tachibana ..................... 502/183 |
| 5,064,805 A | * | 11/1991 | Otowa .......................... 502/427 |
| 5,102,855 A | | 4/1992 | Greinke et al. |
| 5,146,889 A | * | 9/1992 | Swanson et al. ............... 123/376 |
| 5,382,559 A | * | 1/1995 | Carugati et al. ............... 502/427 |
| 5,416,056 A | * | 5/1995 | Baker ............................ 502/425 |
| 5,710,092 A | | 1/1998 | Baker |
| 5,965,483 A | | 10/1999 | Baker et al. |
| 6,258,337 B1 | * | 7/2001 | Sonobe et al. ............. 423/445 R |
| 6,547,990 B2 | * | 4/2003 | Shinozaki et al. ............. 252/502 |
| 6,656,878 B2 | * | 12/2003 | Chang ............................ 502/416 |
| 6,670,304 B2 | * | 12/2003 | Chang ............................ 502/418 |
| 6,768,631 B2 | | 7/2004 | Uehara et al. |
| 6,865,068 B1 | * | 3/2005 | Murakami et al. ............. 361/502 |
| 7,202,195 B2 | | 4/2007 | Cannon et al. |
| 7,723,262 B2 | * | 5/2010 | Feaver et al. .................. 502/416 |
| 8,709,971 B2 | * | 4/2014 | Feaver et al. .................. 502/416 |
| 2006/0140846 A1 | | 6/2006 | Leis et al. |
| 2006/0157419 A1 | | 7/2006 | Karanfil et al. |
| 2007/0191575 A1 | * | 8/2007 | Sumner et al. ................ 528/137 |
| 2007/0248529 A1 | | 10/2007 | Axtell et al. |
| 2008/0107589 A1 | | 5/2008 | von Blucher et al. |
| 2012/0094828 A1 | | 4/2012 | Pfeifer et al. |
| 2012/0172216 A1 | | 7/2012 | Bohringer et al. |
| 2013/0190542 A1 | | 7/2013 | Romanos et al. |
| 2013/0211158 A1 | | 8/2013 | Romanos et al. |

OTHER PUBLICATIONS

Tseng et al., "Preparation of high surface area carbons from Corncob with KOH etching plus CO2 gasification for the adsorption of dyes and phenols from water"; Colloids and Surfaces A: Physicochemical Engineering Aspects; 2006; pp. 69-78; vol. 279.

International Search Report for PCT/US07/84061, dated May 9, 2008, 3 pages.

English translation of Official Decision issued by the Egyptian patent office dated Sep. 1, 2010, 2 pages.

Official Decision issued by the Egyptian patent office, 3 pages.

English translation of Official Action from the Mexican Patent Office dated Aug. 1, 2011, 4 pages.

English translation of Notice of Allowance from the Mexican Industrial Property Institute dated Dec. 22, 2011, 2 pages.

Office Action dated Jun. 22, 2012 for related U.S. Appl. No. 13/278,754; 12 pages.

Egyptian patent application 2009050670 Official Action with translation (7 pages).

Office Action dated Jun. 21, 2013 for related Canadian Patent Application No. 2,668,887 (6 pages).

Office Action dated Jul. 31, 2013 for related Japanese Patent Application No. 2009-536479 (6 pages).

Office Action dated Aug. 15, 2013 for related U.S. Appl. No. 13/278,754 (9 pages).

Office Action from related Korean Patent Application No. 10-2009-7011599, dated Dec. 16, 2013, 5 pgs.

Office Action from related Canadian Patent Application No. 2,668,887, dated Mar. 31, 2014, 2 pgs.

Japanese Patent Application 2009-536479; Office Action dated Oct. 25, 2012 (with translation; 8 pages).

Cao et al.; "Process effects on activated carbon with large specific surface area from corn cob"; Bioresource Technology; vol. 97; pp. 110-115; 2006.

* cited by examiner

HIGH SURFACE AREA CARBON AND PROCESS FOR ITS PRODUCTION

CROSS-REFERENCE TO RELATED APPLICATIONS

This application claims priority to U.S. Provisional Application Ser. No. 60/857,554 filed on Nov. 8, 2006, which is hereby incorporated by reference in its entirety.

GOVERNMENT SUPPORT

The present invention was made, at least in part, with government support under Award ID 0438469 from the National Science Foundation. Accordingly, the United States Government has certain rights in this invention.

FIELD OF THE INVENTION

The present invention relates to high surface area porous carbon materials and, in particular, biomass-based activated carbon materials.

BACKGROUND OF THE INVENTION

Carbon materials, generally referred to as activated carbons, for adsorption, liquid cleanup, gas cleanup, gas storage, and monolith structures are widely available from many sources. Useful carbon materials have high surface areas and a high density of pores with optimal diameters. Table 1 lists the diameters considered to be critical (i.e., pore diameters below which the molecule would not fit into the pore) for adsorption. Observations and theory tend to agree that the optimal diameter for adsorbing a molecule is about 2.7 times the critical diameter, with optimal pore diameters of 6 Å, 6 Å, and 11 Å for hydrogen, acetylene, and methane, respectively.

TABLE 1

Common molecules and their critical diameters ($D_{crit}$)[a]

| Molecule | $D_{crit}$ (Å) |
|---|---|
| Hydrogen | 2.4 |
| Acetylene | 2.4 |
| Oxygen | 2.8 |
| Nitrogen | 3.0 |
| Water | 3.2 |
| Methane | 4.0 |
| Methanol | 4.4 |

[a]Mineral Adsorbents, Filter Agents and Drying Agents. Aldrich Technical Bulletin. http://www.sigmaaldrich.com/Brands/Aldrich/Tech_Bulletins/AL_143/Molecular_Sieves.html.

The available carbons, whether derived from fossil fuels or biomass, rarely have surface areas in excess of 2000 m²/g and generally have pore diameters and pore volumes such that they are not able to adsorb and store >20% of their weight in natural gas (methane) at ambient temperature and a pressure of 500 psig. Thus, there is a need for a carbon material, preferably derived from biomass and hence renewable, with a high surface area and a high volume of pores with diameters in a range that promotes high storage capacity of natural gas and other energy carriers. Activated carbons having these properties would be useful in a wide range of applications, such as fuel tanks in vehicles, batteries, electrical capacitors, separation and purification devices, and catalysts.

BRIEF SUMMARY OF THE INVENTION

Among the various aspects of the invention, one aspect provides an activated carbon comprising greater than about 50% by weight of carbon of biomass origin and a DFT surface area greater than about 1500 m²/g. The activated carbon also comprises a pore volume greater than about 0.6 cc/g for pores whose diameters range from about 10 Å to about 50 Å, a pore volume greater than about 0.4 cc/g for pores whose diameters range from about 10 Å to about 20 Å; and a distribution of pores such that at least about 20% of the pore volume comprises pores whose diameters range from about 20 Å to about 50 Å.

Another aspect of the invention encompasses an activated carbon of biomass origin comprising a DFT surface area greater than about 2850 m²/g, and a pore volume greater than about 0.5 cc/g for pores whose diameters are less than about 10 Å.

A further aspect of the invention provides an activated carbon comprising greater than about 50% by weight of carbon of biomass origin and a DFT surface area greater than about 1500 m²/g. The activated carbon also comprises a 10-20 porosity greater than about 0.25, a pore volume greater than about 0.4 cc/g for pores whose diameters range from about 10 Å to about 20 Å, and a distribution of pores such that at least about 30% of the pore volume comprises pores whose diameters range from about 10 Å to about 20 Å. The 10-20 porosity is defined as the volume of pores with diameters between 10 Å and 20 Å, in cc/g, multiplied by the apparent density, in g/cc.

Still another aspect of the invention encompasses a process for making an activated carbon. The process comprises charring a biomass feed stock comprising greater than about 40% by weight of carbon at a temperature from about 350° C. to about 850° C. to form a char having a DFT surface area greater than about 900 m²/g and a pore volume greater than about 1.0 cc/g for pores whose diameters range from about 10 Å to about 50 Å. The process further comprises activating the char in the presence of an alkaline material having a pH greater than about 9 at a temperature from about 600° C. to about 100° C. to form an activated carbon having a DFT surface area greater than about 1700 m²/g, a total pore volume greater than 1.1 cc/g, and a distribution of pores such that at least 20% of the pore volume comprises pores whose diameter range from about 20 Å to about 50 Å.

Other aspects and features of the invention will be in part apparent and in part pointed out hereinafter.

DETAILED DESCRIPTION OF THE INVENTION

Figure 1:
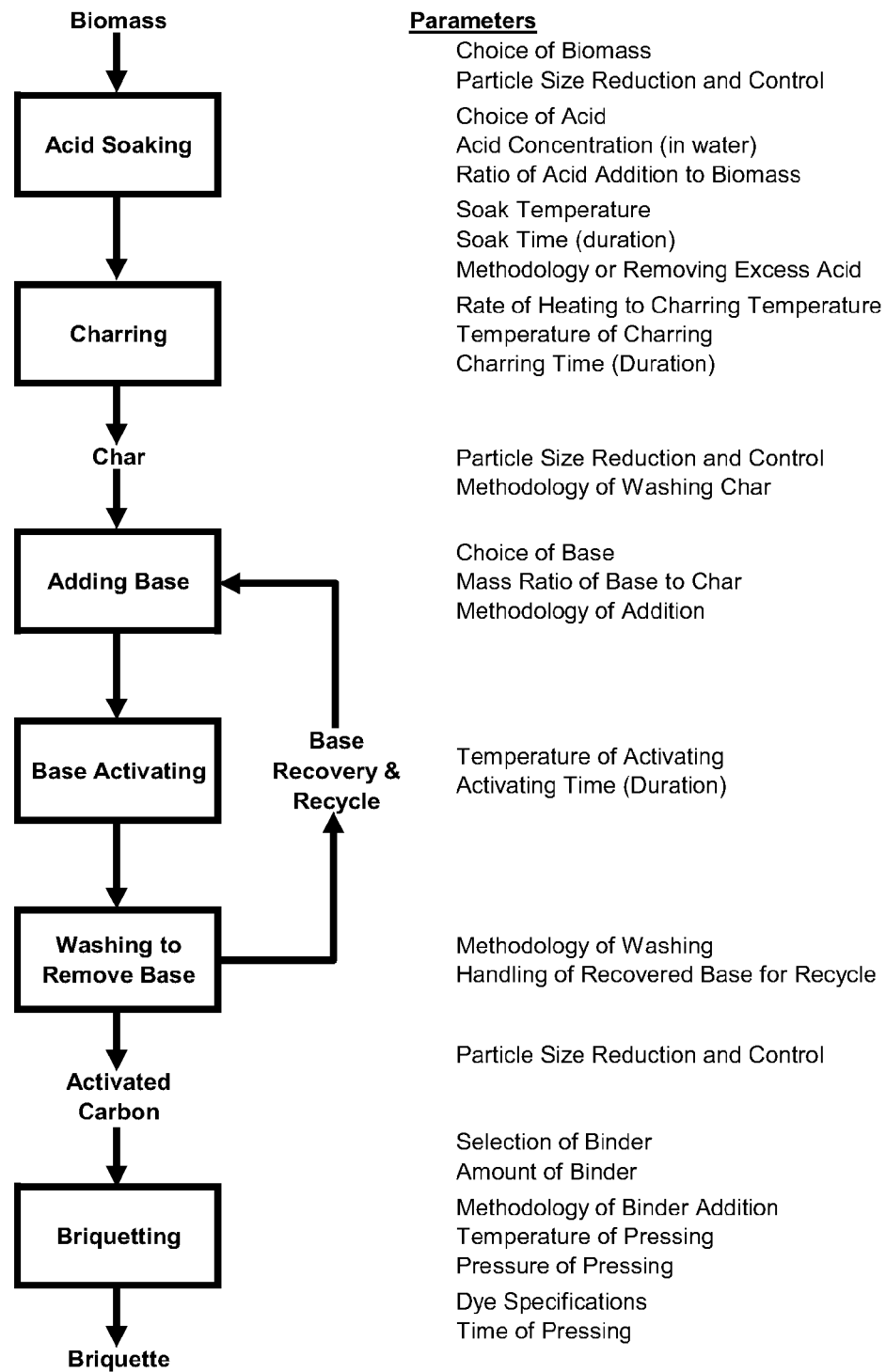
FIG. 1 is a block flow diagram illustrating key steps in the preferred carbon synthesis process. Important parameters that may impact the performance of the activated carbon product are listed to the right.

An activated carbon material has been discovered that has a particularly high mesopore volume and high surface area, such that it has excellent performance advantages in many applications. In certain preferred embodiments, the carbon materials have DFT surface areas in excess of 1500 $m^2/g$. In particular, certain activated carbons of this invention have pore volumes in excess of 1 cc/g for pores whose diameters range from about 10 Å to about 50 Å. This feature of the carbon materials leads to superior performance in application-specific devices as summarized in Table 2. In other embodiments, the activated carbons have DFT surface areas in excess of 2850 $m^2/g$ and these carbons provide superior performance in applications that include natural gas (methane) storage, hydrogen storage, removing forms of soluble metals from liquids, and cleanup of gases.

A multi-step process is used in the manufacturing of these activated carbon materials. The process includes a first charring step that produces a desirable initial micropore and mesopore volume and a second step that produces high surface areas with preservation of useful distributions of mesopore and micropore volumes. A briquetting step densifies the activated carbon and provides for monolith-like material useful in applications such as gas storage, electrical devices, and fluid processing cartridges.

TABLE 2

Application-specific uses of the materials of this invention.

| Application | Critical Parameter | Novelty of Invention Embodiments |
|---|---|---|
| methane storage tank | pore volume for pores with diameters between 10 and 50 Å | >1.0 cc/g |
| hydrogen storage tank | pore volume for pores with at diameters less than 10 Å | >0.5 cc/g |
| | weight % of incorporated metal of atomic weight less than 60 | >1% |
| | weight % of co-adsorbent compound with critical diameter between 7.5 and 12 Å | >1% |
| acetylene storage tank | pore volume for pores with diameters between 10 and 15 Å | >0.7 cc/g |
| separates methane from other gases | pore volume for pores with diameters between 10 and 50 Å | >1.0 cc/g. |
| molecular sieve | pore volume for pores with diameters less than 10 Å | >0.5 cc/g |
| volatile organic compound adsorbent | pore volume for pores with diameters between 10 and 50 Å | >1.2 cc/g |
| water treatment adsorbent. | pore volume for pores with diameters less than 10 Å | >0.5 cc/g |
| electrical capacitor | BET surface area | >2500 $m^2/g$ |
| battery | pore volume for pores with diameters between 10 and 50 Å | >1.0 cc/g |
| | weight % of incorporated metal selected from the group lithium, sodium, lead, cobalt, iron, and manganese | >5% |
| catalyst support | weight % for incorporated metal selected from the group platinum, ruthenium, palladium, copper, chromium, cobalt, silver, gold, and vanadium or acidic or basic sites | >0.1% |
| catalyst support in a fuel cell | BET surface area | >1000 $m^2/g$ |
| ion exchange material | pore volume for pores with diameters between 10 and 50 Å | >1.0 cc/g |
| water treatment adsorbent | weight % of incorporated metal such as iron | >2% |

I. Mesopore Material

One aspect of the invention provides a biomass-based activated carbon that is porous and comprises greater than 50% carbon by weight. Furthermore, the activated carbon has the following properties that improve adsorption: a DFT surface area greater than 1500 m$^2$/g, a pore volume greater than about 0.6 cc/g for pores with diameters between 10 Å and 50 Å, a pore volume greater than about 0.4 cc/g for pores with diameters between 10 Å and 20 Å, and a distribution of pores such that at least about 20% of the pore volume comprises pores with diameters between 20 Å and 50 Å. More preferably the activated carbon has a pore volume greater than about 0.8 cc/g for pores whose diameters range from about 10 Å to about 50 Å. Even more preferably, the activated carbon has a pore volume greater than about 1.1 cc/g for pores whose diameters range from about 10 Å to about 50 Å.

These properties provide for good natural gas (methane) adsorption, including the ability to adsorb greater than 15% of its weight in natural gas at 20° C. and a natural gas pressure of 500 psig. Typically, the micropore volume is between 0.32 and 1.2 cc/g and the mesopore volume is greater than 0.25 cc/g.

Materials for certain applications are more dependent on critical combinations of surface area and pore volume, such as the following:

The preferred activated carbon may be used in a methane storage tank, wherein the activated carbon has a pore volume greater than 1.0 cc/g for pores with diameters between 10 Å and 50 Å.

The preferred activated carbon may be used in a hydrogen storage tank, wherein the activated carbon has a pore volume greater than 0.5 cc/g for pores with diameters less than 10 Å. Preferably, the activated carbon contains at least 1% by weight of a metal of atomic weight less than 60. The activated carbon of the hydrogen storage tank may incorporate a co-adsorbent compound at a weight percentage greater than 1% with the compound having a critical diameter between 7.5 Å and 12 Å.

The preferred activated carbon may be used in a separator that separates methane from other gases, wherein the activated carbon has a pore volume greater than 1.0 cc/g for pores with diameters between 10 Å and 50 Å.

The preferred activated carbon may be used in a volatile organic compound adsorbent, wherein the activated carbon has a pore volume greater than 1.2 cc/g for pores with diameters between 10 Å and 50 Å.

The preferred activated carbon may be used as a water treatment adsorbent to remove organic compounds from water.

Materials for certain other applications are more dependent on surface area, such as the following:

The preferred activated carbon may be used in a battery, wherein the activated carbon has a pore volume greater than 1.0 cc/g for pores with diameters between 10 Å and 50 Å. The activated carbon in this battery may further comprise greater than 5% by weight a metal selected from the group consisting of lithium, sodium, lead, cobalt, iron, and manganese.

The preferred activated carbon may be used as a catalyst support, wherein the carbon further comprises greater than 0.1% by weight a metal selected from the group consisting of platinum, ruthenium, palladium, copper, chromium, cobalt, silver, gold, and vanadium.

The preferred activated carbon may be used as a catalyst support in a fuel cell.

The preferred activated carbon may be used as an ion exchange material, wherein the activated carbon has a pore volume greater than 1.0 cc/g for pores with diameters between 10 Å and 50 Å.

The preferred activated carbon may be used as a water treatment adsorbent to remove metals from water. For some water treatment applications the activated carbon may incorporate greater than 2% by weight of a metal to improve adsorption of targeted materials in the water.

II. Micropore Material

Another aspect of the invention provides activated carbon materials that have very high specific surface areas. These biomass-based activated carbon materials are porous, comprise greater than 50% by weight of carbon, and have improved adsorption characteristics. These activated carbons have the following properties: a nitrogen DFT surface area greater than 2850 m$^2$/g and a pore volume greater than 0.5 cc/g for pores with diameters less than 10 Å. More preferably, the material is an activated carbon with a pore volume greater than 0.50 cc/g for pores in the less than 10 Å diameter range. Even more preferably, the material is an activated carbon with a pore volume greater than 0.70 cc/g for pores in the less-than 10 Å diameter range. More preferably, the DFT surface area is greater than 3100 m$^2$/g.

Materials for certain micropore applications are more dependent on critical combinations of surface area and pore volume, such as the following:

The preferred activated carbon may be used in a molecular sieve, wherein the activated carbon has a pore volume greater than about 0.50 cc/g for pores with diameters less than about 10 Å.

The preferred activated carbon may be used in an acetylene storage tank, wherein the activated carbon has a pore volume greater than about 0.7 cc/g for pores with diameters between about 10 Å and about 15 Å.

The preferred activated carbon may be used in an electrical capacitor, wherein the activated carbon has a BET surface area greater than about 2500 m$^2$/g.

III. Volume-Based Storage Material

Still another aspect of the invention encompasses materials that maximize storage on a per-volume basis. The preferred activated carbon comprises greater than about 50% by weight of carbon of recent biomass origin, and a DFT surface area greater than about 1500 m$^2$/g; a 10-20 porosity, which is defined as the volume of pores with diameters between 10 and 20 Å, in cc/g, multiplied by the apparent density, in g/cc, wherein the 10-20 porosity is greater than about 0.25. The activated carbon further comprises a pore volume greater than about 0.4 cc/g for pores whose diameters range from about 10 Å to about 20 Å, and a distribution of pores such that at least about 30% of the pore volume comprises pores whose diameters range from about 10 Å to about 20 Å. More preferably, the activated carbon has a 10-20 porosity, which is defined as the volume of pores with diameters between 10 and 20 Å, in cc/g, multiplied by the apparent density, in g/cc, wherein the 10-20 porosity is greater than about 0.3, and a pore volume greater than about 0.5 cc/g for pores whose diameters range from about 10 Å to about 20 Å. Metals present at a concentration greater than about 10% by weight may enhance performance in applications such as a methane storage tank, a hydrogen storage tank, an acetylene storage tank, a capacitor, a battery, and a molecular sieve.

IV. Fabrication Process for Activated Carbons

Figure 2:
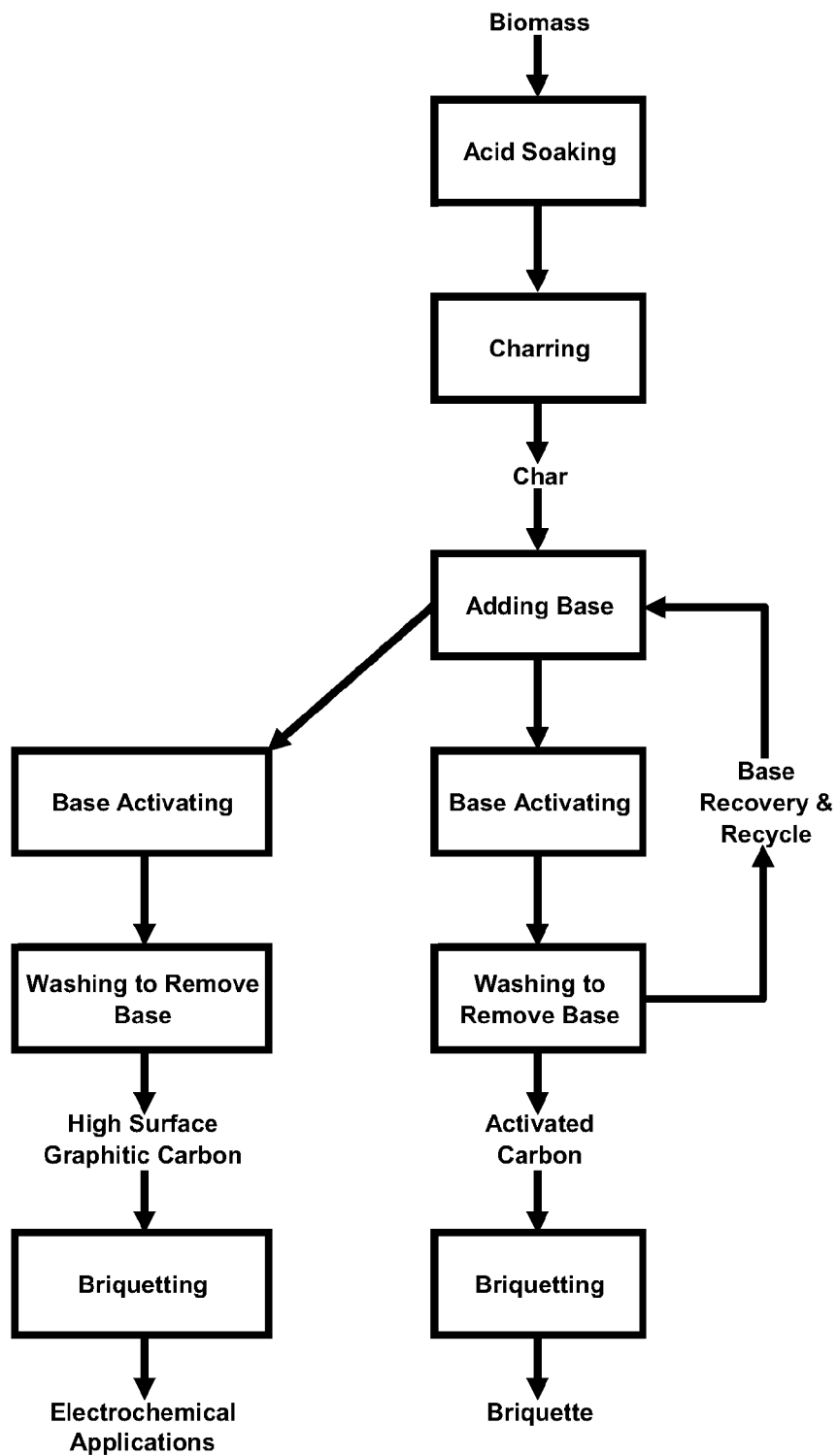
FIG. 2 is a block flow diagram illustrating an alternative synthesis path designed to increase graphite content for producing monolith materials intended for use in electrical devices.

A further aspect of the invention provides a process for making an activated carbon. FIG. 1 illustrates in block flow a preferred process of this invention. This embodiment comprises sequential steps of preparing a biomass, acid soaking, charring, and activating the char in the presence of a base. For many applications, water may be used to wash the activated carbon to remove the base. Optionally, the washed base may be recovered for recycle and reuse. Optionally, the phosphoric acid may also be recovered for recycle. Optionally, the activated carbon may be pressed into a briquette. FIG. 2 illustrates an alternative embodiment with higher temperature base activation to prepare higher-graphite materials for use in electrical devices.

In general, the process fabricates an activated carbon that is porous and comprises greater than 50% by weight of carbon of recent biomass origin. The process comprises charring a biomass feed stock containing greater than 40% by weight of carbon at a temperature from about 350° C. to about 850° C. to produce a char having a DFT surface area greater than about 900 m$^2$/g and a pore volume greater than about 1.0 cc/g for pores whose diameters range from about 10 Å to about 50 Å. The process further comprises activating the char in the presence of an alkaline material having a pH greater than about 9 at a temperature from about 600° C. to about 1000° C. to produce an activated carbon having a DFT surface area greater than about 1700 m$^2$/g, a total pore volume greater than 1.1 cc/g, and a distribution of pores such that at least 20% of the pore volume comprises pores whose diameter range from about 20 Å to about 50 Å.

Preferably, the base is a metallic hydroxide selected from the group consisting of potassium hydroxide, sodium hydroxide, lithium hydroxide, and beryllium hydroxide; the biomass is selected from the group consisting of corn cobs, wood products, olive pits, peach pits, coconut shells, and nut shells; the char is produced from a blend of the biomass and phosphoric acid where the mass ratio of phosphoric acid and biomass is between 0.5:1 and 1:1; and the activated carbon is produced from a blend of the char and metallic hydroxide where the mass ratio of metallic hydroxide and biomass is between 1:1 and 5:1.

The fabrication procedure starts with pretreating the biomass and acid soaking the biomass in steps as summarized in Table 3. In general, smaller particle size makes soaking easier at lower temperatures, and ensures that acid reaches the center of the particle. Phosphoric acid (H$_3$PO$_4$) reacts well with the cellulose and lignin contents of the biomass compared to other acids. Higher acid content generally leads to better phosphorylation of the ligno-cellulosic matters of the biomass; however very high values may result in over-activation and loss of microporosity. Lower soaking temperatures generally ensure that the attack of the acid on the lignin and hemi-cellulose is not excessive and, hence, the structural damage is minimal before the actual temperature of phosphorylation and cross-linking is reached. Higher temperatures may cause structural changes in the biomass before the correct temperature is reached. Twelve hours of soaking time generally ensures that the acid reaches the interior of the biomass uniformly.

The preferred means to char the biomass includes selecting a biomass from the group including corn cobs, fruit seeds/pits, and wood; reducing the particle size to 5-100 mesh; using phosphoric acid at a concentration of 50-70% in water and mixing acid to biomass at a mass ratio from about 0.8:1 to about 1.3:1; soaking the biomass-acid mixture at 30-75° C. for 8-14 hours; and evaporating the excess water (from acid) at 170° C. for about 2 hours.

The exemplary means to char the biomass includes selecting corn cobs as the biomass; reducing the particle size to about 20-30 mesh; using phosphoric acid at a concentration of about 70% in water and mixing phosphoric acid to biomass at a mass ratio from about 0.9:1 to about 1:1; soaking the biomass-acid mixture at about 30° C. for about 12 hours; and evaporating the excess water (from acid) at 170° C. for about 2 hours.

TABLE 3

Preferred conditions for the pretreating and acid soaking steps.

| Parameters | Broad Description | Preferred | Best |
|---|---|---|---|
| Pretreating of Biomass | | | |
| Choice of biomass | Any biomass that can be processed to 2-30 mesh | corn cobs, fruit seeds/pits, wood | corn cobs |
| Particle size reduction and control | Smallest dimension less than 5 inches | 5-100 mesh | 20-30 mesh |
| Acid Soaking | | | |
| Choice of acid | phosphoric, boric, sulfuric, zinc chloride and similar dehydrating agents | phosphoric acid | phosphoric acid |
| Acid concentration (in water) | 30-80% | 50-70% | 70% |
| Mass ratio of acid to biomass | 0.2:1 to 1.5:1 | 0.8:1 to 1.3:1 | 0.9:1 to 1:1 |
| Soak temperature | 10-100° C. | 30-75° C. | 30° C. |
| Soak time (duration) | 2-24 hrs | 8-14 hrs | 12 hrs |
| Methodology for removing excess acid | Contact/wash with water, heat to evaporate residual water and some of the acid | Evaporate near 170° C. for about 2 hours | |

Conditions for charring and washing of the char are summarized in Table 4. The rate of heating is slow, but not necessary over entire temperature range. The charring time is the period of time at the final temperature; charring occurs even during the heat-up process at temperatures greater than about 300° C. Preferred particle sizes relate to particle sizes that make soaking easier at lower temperatures, and ensure that the acid reaches the center of the particle.

The preferred charring conditions are heating to the charring temperature of at a rate of less than 2° C./min and charring at a temperature between 400 and 600° C. for 0.5 to 3 hours. Exemplary conditions are heating to the charring temperature at a rate of about 0.5° C./min and charring at a temperature of about 450° C. for 1.5 hours.

TABLE 4

Preferred conditions for the charring and washing of char steps.

| Parameters | Broad Description | Preferred | Best |
|---|---|---|---|
| Charring | | | |
| Rate of heating to charring temperature | Whatever is cost effective, faster heating rates may require more-costly equipment | Less than 2° C./min | 0.5° C./min |
| Temperature of charring | 350-850° C. | 400-600° C. | 450° C. |
| Charring time (duration) | 0-24 hr | 0.5-3 hr | 1.5 hr |
| Methodology for washing char | Contact/wash with water | Trickle water through bed of carbon until pH of water is 7 | |
| Particle size reduction and control | Smallest dimension less than 0.5 inches | 5-200 mesh | 20-60 mesh |
| Cooling | Whatever is cost effective, faster heating rates may require more-costly equipment | Less than 2° C./min | |

TABLE 4-continued

Preferred conditions for the charring and washing of char steps.

| Parameters | Broad Description | Preferred | Best |
|---|---|---|---|
| Rate of heating to charring temperature | Whatever is cost effective | | <2° C./min |

Conditions for adding the base, base activating, and washing to remove the base are summarized in Table 5. The preferred base is KOH since it often produces pores with smaller diameter than other bases. Smaller particle sizes allow for a better reaction of char with KOH.

The preferred conditions for adding base and activating are adding a base to a char having a surface area greater than 900 $m^2/g$ and mesopore volume greater than 0.3 cc/g, wherein the base is selected from the group consisting of KOH, NaOH, and LiOH such that the mass ratio of base to char is from about 1.5:1 to about 5:1. Activating is preferably performed at 700-900° C. in the absence of oxygen, such as with a nitrogen purge, for about 0.1 to about 3 hours. For most, but not all, applications the activated carbon is washed with water after cooling to ambient temperature until the wash water has a pH less than 7.0.

Exemplary conditions include using KOH at a mass ratio of about 2.5:1 to about 4:1, activating at about 800° C. in the absence of oxygen for about 1 hour.

In some embodiments, the activated carbon may be further processed into briquettes. Preferred conditions for briquetting are summarized in Table 6. Optimum amounts of binder provide enough compression and abrasion strengths to the monoliths and promote higher densities. Higher binder additions can plug pores and decrease micropore volumes. Preferred briquetting temperatures allow the binder to reach the glass transition phase and provide monoliths with better compressive and abrasive strengths. Preferred pressures lead to monoliths with high piece densities (apparent density) and better compressive and abrasive strengths. Pressures even higher than 16000 psi may be effective and, in some cases, preferred. Pressing time and post-treating at elevated temperatures may be needed to open the pore structure in the briquette as some pores may be plugged with binder.

The preferred conditions for briquetting include mixing 40-100 mesh activated carbon particles with about 20-40% of a briquette binder, such as polyvinylidene chloride or modified soybean oil. The preferred method to modify a vegetable oil, preferably soybean oil, for use as a briquette binder is to body the vegetable oil. The preferred bodying process is to heat the oil at a temperature from about 200° C. to about 400° C. in the absence of oxygen for an adequate period of time such that the viscosity is increased to at least 200 cP but less than 40000 cP. Preferably, the briquette is formed by pressing at a temperature of about 150-180° C., at a pressure of about 14000-16000 psi for about 1-2 hours. The preferred post-treatment pyrolysis is at a temperature of about 700-900° C.

TABLE 5

Preferred conditions for adding base, base activating, and washing to remove base steps.

| Parameters | Broad Description | Preferred | Best |
|---|---|---|---|
| Adding Base | | | |
| Choice of base | KOH, NaOH, LiOH, $K_2CO_3$, $Na_2CO_3$, pH >10 | KOH, NaOH, LiOH | KOH |
| Mass ratio of base to char | 0.5:1 to 6:1 | 1.5:1 to 5:1 | 2.5:1 to 4:1 |
| Methodology of Addition | | Mix base, carbon, and water in paste to slurry consistency | |
| Base Activating | | | |
| Rate of heating to charring temperature | Whatever is cost effective, faster heating rates may require more-costly equipment | 5-15° C./min | 9-10° C./min |
| Temperature of activating | 600-1000° C. | 700-900° C. | 800° C. |
| Activating time (duration) | 0.1-24 hr | 0.1-3 hr | 1 hr |
| Cooling | Whatever is cost effective, faster heating rates may require more-costly equipment | Less than 2° C./min | |
| Washing to Remove Base | | | |
| Methodology for washing | Contact/wash with water | Trickle water through bed of carbon until pH of water is 7 | |
| Handling of recovered base for recycle | Evaporate excess water from wash water | Staged and/or countercurrent wash that concentrates base in wash water | |

Exemplary conditions for briquetting include mixing 50-100 mesh activated carbon particles with about 30% of a briquette binder, such as polyvinylidene chloride or modified soybean oil. The briquette is formed by pressing at a temperature of about 175° C., at a pressure of about 16000 psi for about 990 min, and then heating at a temperature of about 750° C.

TABLE 6

Preferred conditions for briquetting.

| Parameters | Broad Description | Preferred | Best |
|---|---|---|---|
| Briquetting | | | |
| Particle size reduction and control | 20-100 mesh | 40-100 mesh | 50-100 mesh |
| Selection of binder | Any material capable of polymerizing at temperatures above 100° C., adhesives, or thermoplastic polymers | polyvinylidene chloride, modified soybean oil | |
| Amount of binder | 5-50% | 20-40% | 30% |
| Methodology for binder addition | Thoroughly mix such that all components have at least some minimum particle size | Add carbon to liquids to generate evenly mixed wetted carbon | |
| Temperature of pressing | 130-180° C. | 150-180° C. | 175° C. |
| Pressure of pressing | 13000-17000 psi | 14000-16000 psi | 16000 psi |
| Dye specifications | No restrictions so long as temperature, pressure, and time constraints are met throughout mold | | |
| Briquette dimensions | No restrictions | 0.25-6" height, 0.25-4" dia | 1" height, 3.5" dia |
| Time of pressing | 0.1-270 min | 60-120 min | 90 min |
| Temperature of post-treatment pyrolysis | 600-1200° C. | 700-900° C. | 750° C. |
| Rate of heating during binder removal | 0.1-5° C./min | 0.1-2° C./min | 0.1° C./min up to 500° C.; 1.5° C./min up to 750° C. |

When preparing briquettes for electrochemical applications, it is preferred to use activating conditions that lead to higher graphite contents and binders that have or promote electrical conductivity.

By example, applications of the activated carbon material of this invention include: methane storage (especially with briquette embodiments); hydrogen storage (especially with briquette embodiments); purification of methane from landfill gases; purification of methane from natural gas wells; adsorption of volatile organic compounds from gases processed for release from chemical processes; adsorption of catalysts from products of liquid synthesis (including use of cartridges with briquette embodiments); supports for metal and acid catalysts; and electrode assemblies for use in batteries and/or fuel cells. As an example, Example 5 illustrates an application for removing soluble metals from an aqueous solution.

Definitions

To facilitate understanding of the invention, several terms are defined below.

An "activated carbon," as used herein, refers to a char that has undergone a second heat treatment method (>300° C.) to increase surface area.

The "BET surface area" is computed from Brunauer-Emmett-Teller (BET) analysis of a nitrogen adsorption isotherm.

The term "biomass", as used herein refers to recent organic matter, wherein "recent" generally means that it was produced as a direct or indirect result of photosynthesis within the past 10 years. Carbon-14 dating methods may be used to identify whether or not a carbon material is from biomass versus fossil fuels.

The phrase "biomass-based material" refers to a material that was made from biomass by manmade chemical or thermal processes.

The term "char," as used herein, refers to a biomass that has been heat treated (>300° C.) one time to produce a material with a DFT surface area greater than about 900 m$^2$/g.

The "DFT surface area" is computed from density functional theory (DFT) analysis of a nitrogen adsorption isotherm.

As used herein, a "mesopore" refers to a pore with a diameter from about 20 Å to about 500 Å.

As used herein, a "micropore" refers to a pore with a diameter less than about 20 Å.

The term "10-20 porosity," as used herein, refers to the volume of pores with diameters between 10 Å and 20 Å, in cc/g, multiplied by the apparent density, in g/cc. The term "7.5-20 porosity," as used herein, refers to the volume of pores with diameters between 7.5 Å and 20 Å, in cc/g, multiplied by the apparent density, in g/cc.

As various changes could be made in the above-described materials and processes without departing from the scope of the invention, it is intended that all matter contained in the above description and the examples presented below, shall be interpreted as illustrative and not in a limiting sense.

EXAMPLES

The following examples illustrate various embodiments of the invention. The following conclusions may be drawn regarding the embodiments of this invention:

- The best performing samples of this invention had pore volumes greater than 1.8 cc/g except for S-33/k, which performed well despite not meeting this criterion. More broadly described, the preferred materials had pore volumes greater than 1.2 cc/g. Stated another way, the preferred materials had pore volumes in excess of about 1.0 cc/g for pores whose diameters ranged from about 7.5 Å to about 50 Å in diameter.
- Methane surface area does correlate with pore volumes greater than 7.5 Å and less than 50 (or 40) Å.
- Methane uptake does not correlate with pore volumes less than 7.5 Å.
- Methane uptake at pressures higher than 500 psig (positive slope on excess adsorption at 500 psig) is enhanced by pores in the 20-40 Å diameter range. This is a distinct advantage of the embodiments of this invention with substantial pore volume in the 20-30 Å diameter range.
- Hydrogen uptake correlates with pore volume in pores with diameters less than 10 Å.
- Optimal KOH:char ratio is about 2.5:1 to 4.0:1 for methane storage.
- Slightly reduced combinations of activation temperature and KOH lead to more pores <7.5 Å and very high surface area. Novel materials were made with pore volumes >0.5 cc/g in the <7.5 Å range. An interpretation of the processing is that higher temperatures cause KOH to continue to increase pore diameters to values greater than 10 Å. There are optimal values of activation temperature, KOH concentration, and activation time to maximize the volume of pores with diameters near about 10 Å. These optimal values are near those used to prepare samples S56 and Ba5.1 (see Table 7).
- Soaking at 80° C. rather than 50° C. leads to greater density. Density tends to increase with soaking at a temperature between 75° C. and 100° C. for at least two hours prior to charring.
- Higher acid concentration in soaking leads to greater density.
- Capacitor functionality correlates with high surface area.

Example 1

Preparation and Characterization of Preferred Carbon Samples

A series of experiments were carried out to demonstrate the impact of different parameters (e.g., phosphoric acid treatment and KOH activation) on the final carbon pore volume, pore size distribution, and surface area. For purposes of clarity, the carbon materials prior to base (preferably KOH) activation are referred to as char and after base activation as activated carbon.

Dried crushed corncobs were mixed with different concentrations of phosphoric acid ranging from 0-70% by volume in the weight ratio of 1:1.5 (grams corn cob: grams phosphoric acid/water solution). This is about a 0.8:1 ratio of acid mass to corn cob mass on a water-free basis. The corn cobs were soaked at different temperatures in phosphoric acid for about 8-10 hrs. After that, the excess of phosphoric acid was removed by heating the mixture at 165-175° C. for 2 hrs. Then the soaked corncobs were carbonized at a constant temperature in the range 400-800° C. for 1 hour in nitrogen atmosphere to form a char. After carbonization, the char was washed thoroughly with water until the effluent has a pH of about 7 to remove the excess acid.

In order to get higher pore volumes and higher surface areas the char obtained by phosphoric acid was further treated. The char was mixed with varying amounts of KOH flakes and water to form a slurry. This slurry was then heated to temperatures between 700 to 900° C. in an inert atmosphere (e.g., under nitrogen) for one hour. The final product was then washed thoroughly with water until the effluent had a pH of about 7 to remove potassium solids formed during the reaction. KOH activation of the char formed an activated carbon.

The characterization of all the char/carbon produced was done with $N_2$ adsorption at 77 K using the Autosorb 1-C instrument from Quantachrome. Analysis of isotherms was carried out by applying various methods to obtain different information. The BET equation was used to get the BET surface area from the $N_2$ isotherm. The T-method was used to find the micropore volume and the external surface area of the mesoporous fraction from the volume of $N_2$ adsorbed up to the $P/P_0=0.0315$. The DFT method was used to estimate surface area as a function of pore size, while the BET method was used to report total surface area. Unless otherwise reported, these parameters were used in preparing the activated carbon.

Table 7 summarizes the preparation, characterization, and performance of several embodiments of this invention. For methane storage, the preferred samples had excess methane adsorption greater than 170 g/kg (grams of methane per kilogram of activated carbon). The more preferred samples also had a volume-for-volume methane storage capacity greater than 160 V/V.

Methane Uptake Analysis—A cylindrical pressure vessel of approximately 10 cc in volume was packed to approximately 85% full with a measured mass of carbon. The vessel was closed and subjected to about 0.02 bars absolute pressure (vacuum) for 4 hours at a temperature of 140° C. The mass change due to being subjected to vacuum was measured and the mass of carbon in the container was reduced based on this change. The cylinder was then pressured to 500 psig with methane at 20° C. for an hour to allow equilibration with the pressure and temperature. The mass increase from the vacuum state to equilibrium at these conditions was measured. The mass of the methane uptake minus the amount of mass of methane in the void space in the vessel was divided by the mass of the carbon to obtain the excess adsorption of methane per mass of carbon.

TABLE 7

Preparation conditions, performances, and properties of activated carbon samples with best performances.

| | Sample Name | | | | | | |
|---|---|---|---|---|---|---|---|
| | Ba5.32 | S-33/k | S-52 | S-59 | S-58 | Ba5.31 | S-62 |
| | | | | Alt. Name | | | |
| | | KC2.5 | KC3 | KOH-HTT5 | KOH-HTT4 | | |
| Feed | Corn Cob | Corn Cob | Corn Cob | Corn Cob | Corn Cob | Corn Cob | Corn Cob |
| Acid Conc. | 0.516 | | 0.5 | 0.5 | 0.5 | 0.516 | |
| Soak T (° C.) | 45 | 80 | 50 | 50 | 50 | 45 | 50 |
| Acid:Feed (g:g) | 0.8 | 0.8 | 0.8 | 0.8 | 0.8 | 0.8 | 1 |
| Char T (° C.) | 450 | 450 | 480 | 480 | 480 | 450 | 480 |
| Base:Char (g:g) | 4 | 2.5 | 3 | 3 | 3 | 4 | 4 |
| Activation time | 1 hr | | 1 hr | 1 hr | 1 hr | 1 hr | |
| Activation T (° C.) | 790 | 790 | 800 | 900 | 850 | 790 | 790 |
| Methane Storage (20° C., 500 psig) | | | | | | | |
| Excess Ads (g/kg)[a] | 197 | 193 | 193 | 186 | 179 | 176 | 175 |
| Total Ads g/kg[b] | 247 | 224 | 241 | 251 | 238 | 228 | 220 |
| Total Ads in g/l[b] | 95 | 130 | 100 | 100 | 83 | 89 | 96 |
| Total Ads in V/V[c] | 145 | 199 | 153 | 152 | 127 | 136 | 146 |
| BET[d] SA1) [m$^2$/g] | 3173 | 2129 | 2997 | 2932 | 3421 | 2939 | 3010 |
| DFT[e] SA2) < 360 Å [m$^2$/g] | 2153 | 2149 | 2788 | 1934 | 2394 | 1852 | 2360 |
| DFT[e] SA2) < 7.5 Å [m$^2$/g] | 543 | 954 | 1292 | 442 | 570 | 422 | 838 |
| Porosity | 0.81 | 0.71 | 0.79 | 0.80 | 0.83 | 0.81 | 0.78 |
| Apparent Density[f] (g/cc) | 0.38 | 0.58 | 0.41 | 0.40 | 0.35 | 0.39 | 0.44 |
| Pore Vol < 7.5 Å [cc/g] | 0.16 | 0.26 | 0.38 | 0.13 | 0.17 | 0.12 | 0.24 |
| Pore Vol < 10 Å [cc/g] | 0.24 | 0.39 | 0.52 | 0.20 | 0.27 | 0.18 | 0.34 |
| Pore Vol < 16 Å [cc/g] | 0.62 | 0.81 | 0.92 | 0.49 | 0.69 | 0.45 | 0.77 |
| Pore Vol < 20 Å [cc/g] | 0.86 | 0.96 | 1.15 | 0.66 | 0.87 | 0.64 | 0.98 |
| Pore Vol < 36 Å [cc/g] | 1.51 | 1.05 | 1.47 | 1.41 | 1.67 | 1.44 | 1.48 |
| Pore Vol < 50 Å [cc/g] | 1.66 | 1.06 | 1.56 | 1.72 | 2.00 | 1.59 | 1.56 |
| Pore Vol < 360 Å [cc/g] | 1.87 | 1.09 | 1.72 | 1.85 | 2.16 | 1.83 | 1.62 |
| Total Pore Vol Direct from Isotherm [cc/g] | 2.11 | 1.22 | 1.91 | 2.02 | 2.37 | 2.07 | 1.80 |
| Pore Vol (3-10 Å)[g] | 0.24 | 0.39 | 0.52 | 0.20 | 0.27 | 0.18 | 0.34 |
| Pore Vol (7.5-16 Å) | 0.46 | 0.56 | 0.55 | 0.36 | 0.52 | 0.33 | 0.52 |
| Pore Vol (10-20 Å) | 0.62 | 0.57 | 0.63 | 0.45 | 0.60 | 0.46 | 0.64 |
| Pore Vol (10-50 Å) | 1.42 | 0.67 | 1.04 | 1.52 | 1.73 | 1.41 | 1.22 |
| 7.5-20 Porosity[h] | 0.27 | 0.41 | 0.32 | 0.21 | 0.25 | 0.20 | 0.32 |
| 10-20 Porosity[h] | 0.24 | 0.33 | 0.26 | 0.18 | 0.21 | 0.18 | 0.28 |
| Percent Pores at 20-50 Å | 37.7 | 8.8 | 21.2 | 52.7 | 47.4 | 46.0 | 32.2 |
| Percent Pores at 10-20 Å | 29.5 | 46.3 | 33.0 | 22.3 | 25.5 | 22.3 | 35.7 |
| Percent Pores < 50 Å | 78.5 | 87.0 | 81.3 | 85.1 | 84.4 | 77.0 | 86.8 |

| | Sample Name | | | | | | |
|---|---|---|---|---|---|---|---|
| | B-21/k | Ba5.2 | S-56 | S-55 | Ba5.1 | S-36 | S-30 |
| | | | | Alt. Name | | | |
| | | | KOH-HTT2 | KOH-HTT1 | | | |
| Feed | Corn Cob | Corn Cob | Corn Cob | Corn Cob | Corn Cob | PVDC Latex | Saran |
| Acid Conc. | | 0.516 | 0.5 | 0.5 | 0.516 | | |
| Soak T (° C.) | 80 | 45 | 50 | 50 | 45 | | |
| Acid:Feed (g:g) | 0.8 | 0.8 | 0.8 | 0.8 | 0.8 | | |
| Char T (° C.) | 450 | 450 | 480 | 480 | 450 | | |
| Base:Char (g:g) | 2.5 | 3 | 3 | 3 | 2 | | |
| Activation time | | 1 hr | 1 hr | 1 hr | 1 hr | 1 hr | 1 hr |

TABLE 7-continued

Preparation conditions, performances, and properties of activated carbon samples with best performances.

| Activation T (° C.) | 790 30% binder | 790 | 750 | 700 | 790 | 750 | 750 |
|---|---|---|---|---|---|---|---|
| Methane Storage (20° C., 500 psig) | | | | | | | |
| Excess Ads (g/kg)$^a$ | 170 | 158 | 146 | 141 | 135 | 77 | 74 |
| Total Ads g/kg$^b$ | 205 | 195 | 195 | 173 | 182 | 87 | 84 |
| Total Ads in g/l$^b$ | 108 | 99 | 79 | 98 | 76 | 94 | 93 |
| Total Ads in V/V$^c$ | 165 | 151 | 121 | 150 | 117 | 143 | 142 |
| BET$^d$ SA1) [m$^2$/g] | 2243 | 2256 | 3175 | 1988 | 2556 | 660 | 591 |
| DFT$^e$ SA2) < 360 Å [m$^2$/g] | 2106 | 2089 | 3484 | 2167 | 3158 | 954 | 1062 |
| DFT$^e$ SA2) < 7.5 Å [m$^2$/g] | 987 | 931 | 2095 | 1282 | 2164 | 796 | 895 |
| Porosity | 0.74 | 0.75 | 0.80 | 0.72 | 0.79 | 0.46 | 0.45 |
| Apparent Density$^f$ (g/cc) | 0.53 | 0.51 | 0.41 | 0.57 | 0.42 | 1.07 | 1.10 |
| Pore Vol < 7.5 Å [cc/g] | 0.29 | 0.27 | 0.61 | 0.37 | 0.63 | 0.23 | 0.22 |
| Pore Vol < 10 Å [cc/g] | 0.39 | 0.38 | 0.77 | 0.43 | 0.76 | 0.25 | 0.25 |
| Pore Vol < 16 Å [cc/g] | 0.71 | 0.72 | 1.16 | 0.75 | 0.98 | 0.28 | 0.28 |
| Pore Vol < 20 Å [cc/g] | 0.88 | 0.87 | 1.32 | 0.85 | 1.03 | 0.29 | 0.28 |
| Pore Vol < 36 Å [cc/g] | 1.09 | 1.09 | 1.56 | 0.97 | 1.26 | 0.33 | 0.31 |
| Pore Vol < 50 Å [cc/g] | 1.16 | 1.17 | 1.64 | 1.02 | 1.39 | 0.36 | 0.34 |
| Pore Vol < 360 Å [cc/g] | 1.26 | 1.31 | 1.78 | 1.13 | 1.69 | 0.39 | 0.38 |
| Total Pore Vol Direct from Isotherm [cc/g] | 1.40 | 1.47 | 1.97 | 1.26 | 1.88 | 0.43 | 0.41 |
| Pore Vol (3-10 Å)$^g$ | 0.39 | 0.38 | 0.77 | 0.43 | 0.76 | 0.25 | 0.25 |
| Pore Vol (7.5-16 Å) | 0.42 | 0.45 | 0.55 | 0.38 | 0.36 | 0.05 | 0.06 |
| Pore Vol (10-20 Å) | 0.49 | 0.49 | 0.55 | 0.42 | 0.27 | 0.04 | 0.04 |
| Pore Vol (10-50 Å) | 0.77 | 0.79 | 0.87 | 0.59 | 0.64 | 0.11 | 0.09 |
| 7.5-20 Porosity$^h$ | 0.32 | 0.30 | 0.29 | 0.27 | 0.17 | 0.07 | 0.07 |
| 10-20 Porosity$^h$ | 0.26 | 0.25 | 0.22 | 0.24 | 0.11 | 0.05 | 0.04 |
| Percent Pores at 20-50 Å | 20.0 | 20.1 | 16.1 | 13.6 | 19.4 | 15.3 | 13.4 |
| Percent Pores at 10-20 Å | 35.1 | 33.4 | 28.2 | 33.4 | 14.5 | 9.8 | 8.8 |
| Percent Pores < 50 Å | 83.3 | 79.2 | 83.2 | 81.3 | 74.0 | 82.9 | 83.6 |

$^a$Excess adsorption, $m_{ads,e}$, denotes the difference between the mass of methane adsorbed and the mass of an equal volume of non-adsorbed methane. Excess adsorption depends only on the surface area and how strongly the surface adsorbs methane; i.e., excess adsorption does not depend on the pore volume of the sample.
$^b$The amount stored, $m_{st}$, denotes the total mass of methane present in the pore space (adsorbed plus non-adsorbed methane). It was computed from excess adsorption as $m_{st}/m_s = m_{ads,e}/m_s + (\rho_a^{-1} - \rho_s^{-1})\rho_{methane}$, where $m_s$ denotes the mass of the sample, $\rho_a$ denotes the apparent density of the sample, $\rho_s$ denotes the skeletal density of the sample, and $\rho_{methane}$ denotes the density of bulk methane at the given temperature and pressure. The gravimetric storage capacity, $m_{st}/m_s$, increases if the apparent density, $\rho_a$, decreases. The volumetric storage capacity, $\rho_a m_{st}/m_s$, decreases if $\rho_a$ decreases.
$^c$The volume-for-volume storage capacity, V/V, was computed as the amount stored, expressed as volume of methane at 25° C. and atmospheric pressure, per volume of sample, $\rho_a/m_s$.
$^d$Computed from Brunauer-Emmett-Teller (BET) analysis of the nitrogen adsorption isotherm.
$^e$Computed from density functional theory (DFT) analysis of the nitrogen adsorption isotherm.
$^f$Apparent density, $\rho_a$, denotes the density of the sample including the pore space and was computed from $\rho_a = (V_{pore}/m_s + \rho_s^{-1})^{-1}$, where $V_{pore}$ denotes the total pore volume of the sample, $m_s$ denotes the mass of the sample, and $\rho_s$ denotes the skeletal density of the sample (density of the sample without the pore space).
$^g$The lower limit of 3 Å is implied as a result of nitrogen being used to evaluate porosity. The instrument's software reported this value as <7.5 Å.
$^h$10-20 porosity is defined as the volume of pores with diameters between 10 and 20 Å, in cc/g, multiplied by the apparent density, in g/cc. The 7.5-20 porosity is defined as the volume of pores with diameters between 7.5 and 20 Å, in cc/g, multiplied by the apparent density, in g/cc.

Example 2

Parametric Studies on Charring Process

Table 8 summarizes the parametric study results on charring with phosphoric acid using 40-60 mesh corn cob stock.

The C-series demonstrates the impact of phosphoric acid concentration in which higher concentrations of phosphoric acid lead to higher surface areas for the char that is produced. This charring step consistently produces a char with a BET surface area of at least 900 m$^2$/g.

The ST-series demonstrates the impact of acid soaking temperature. Soak temperatures greater than 80° C. dramatically decreased the BET surface area and increased char density.

The HTT-series demonstrates the impact of charring temperature in which exceeding higher charring temperatures results in decreased micropore volumes and decreased surface areas. Charring temperatures near 450° C. consistently produced a char with a BET surface area of at least 900 m²/g. Charring temperatures above about 450° C. decreased surface areas and micropore volumes.

The N-series re-evaluates the impact of charring temperature at the narrower range of temperatures of 400, 450, and 500° C. and with subsequent KOH activation. Process parameters included: 80% phosphoric acid, 1.5 g/g ratio of acid to feed stock, soaking at 80° C. for 24 hours, heating at 1.5° C./min to the indicated charring temperatures, charring for 1.5 hours at the indicated temperatures, a KOH:char ratio of 2 g/g, heating at maximum oven rate to the activation temperature, activation at 790° C. for 1 hour, cooling overnight, and washing with water to a neutral pH in a vacuum-drawn filter. The mass of carbon for methane uptake studies was at near-constant volume—the higher charring temperatures resulted in higher density carbons. Thus, while excess adsorption (g/g) was nearly constant over the 400-500° C. range, the V/V storage capacity increased with increasing temperature.

The RH-series demonstrates the impact of heating rate. Charring rates above about 0.5° C./min decreased surface areas and micropore volumes.

TABLE 8

Results of parametric study on charring conditions.

| Sample | % of H₃PO₄ Solution | Temperature of Charring ° C. | Rate of Heating ° C./min | Temperature of Soaking ° C. | BET Surface Area m²/g | Micropore Volume cc/g |
|---|---|---|---|---|---|---|
| Impact of Phosphoric Acid Concentration: C-Series ||||||| 
| C-1 | 30 | 450 | 1.0 | 40 | 934 | 0.252 |
| C-2 | 50 | 450 | 1.0 | 40 | 986 | 0.278 |
| C-3 | 70 | 450 | 1.0 | 40 | 1195 | 0.315 |
| Impact of Acid Soak Temperature: ST-Series ||||||| 
| ST-1 | 50 | 450 | 1.0 | 30 | 1520 | 0.174 |
| ST-2 | 50 | 450 | 1.0 | 80 | 1017 | 0.164 |
| ST-3 | 50 | 450 | 1.0 | 85 | 691 | 0.089 |
| Impact of Charring Temperature: HTT-Series ||||||| 
| HTT-1 | 50 | 450 | 1.0 | 50 | 910 | 0.197 |
| HTT-2 | 50 | 650 | 1.0 | 50 | 826 | 0.052 |
| HTT-3 | 50 | 800 | 1.0 | 50 | 802 | 0.047 |
| HTT-4 | 50 | 850 | 1.0 | 50 | 424 | 0.073 |

Impact of Charring Temperature: N-Series

| Sample | Temperature of Charring ° C. | Mass Carbon in Chamber | Methane Uptake (excess adsorption) g/100 g |
|---|---|---|---|
| N-4.2-2 | 400 | 1.26 | 0.159 |
| N-2-2 | 450 | 2.75 | 0.166 |
| N-3-2 | 500 | 2.55 | 0.163 |

Impact of Heating Rate: RH-Series

| Sample | % of H₃PO₄ | Temperature of Charring | Rate of Heating | Temperature of Soaking | BET Surface Area | Micropore Volume |
|---|---|---|---|---|---|---|
| RH-1 | 50 | 450 | 0.5 | 80 | 1135 | 0.145 |
| RH-2 | 50 | 450 | 1 | 80 | 754 | 0.124 |
| RH-3 | 50 | 450 | 1.5 | 80 | 637 | 0.115 |

Example 3

Parametric Studies on Activation Process

Table 9 summarizes parametric study results on activation with KOH. The default process conditions of Example 1 apply.

Figure 3:
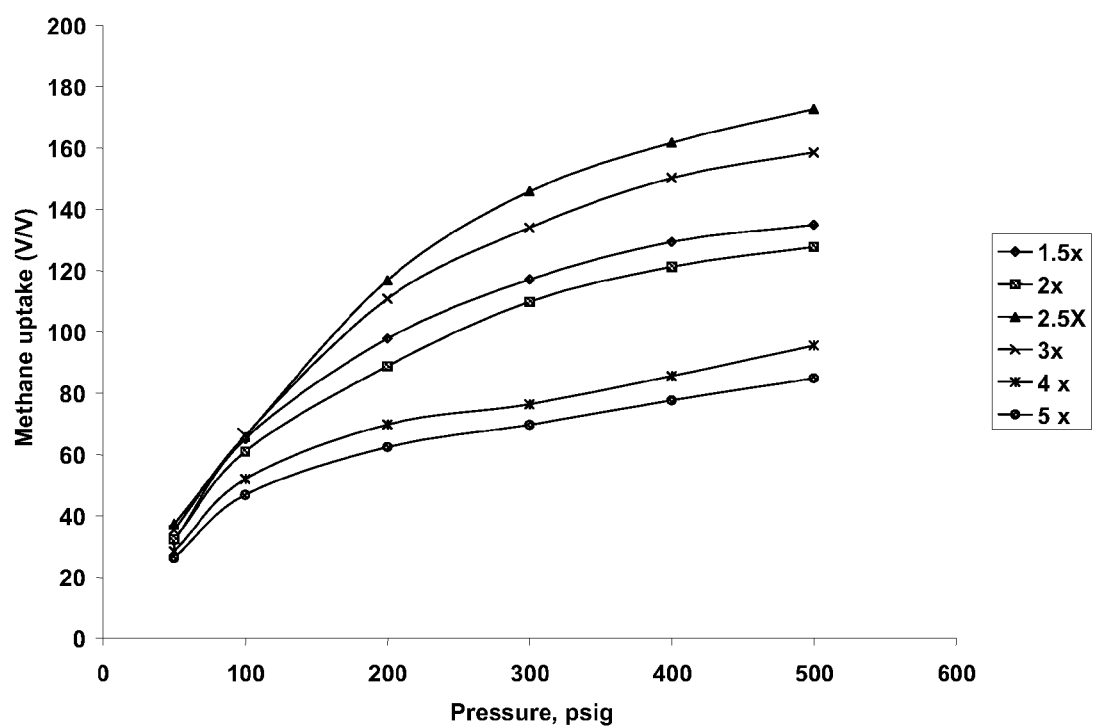
FIG. 3 shows volume-for-volume methane storage isotherms for activated carbon prepared with different rates of base treatment in the base activation step. Uptake is at 20° C.
Figure 4:
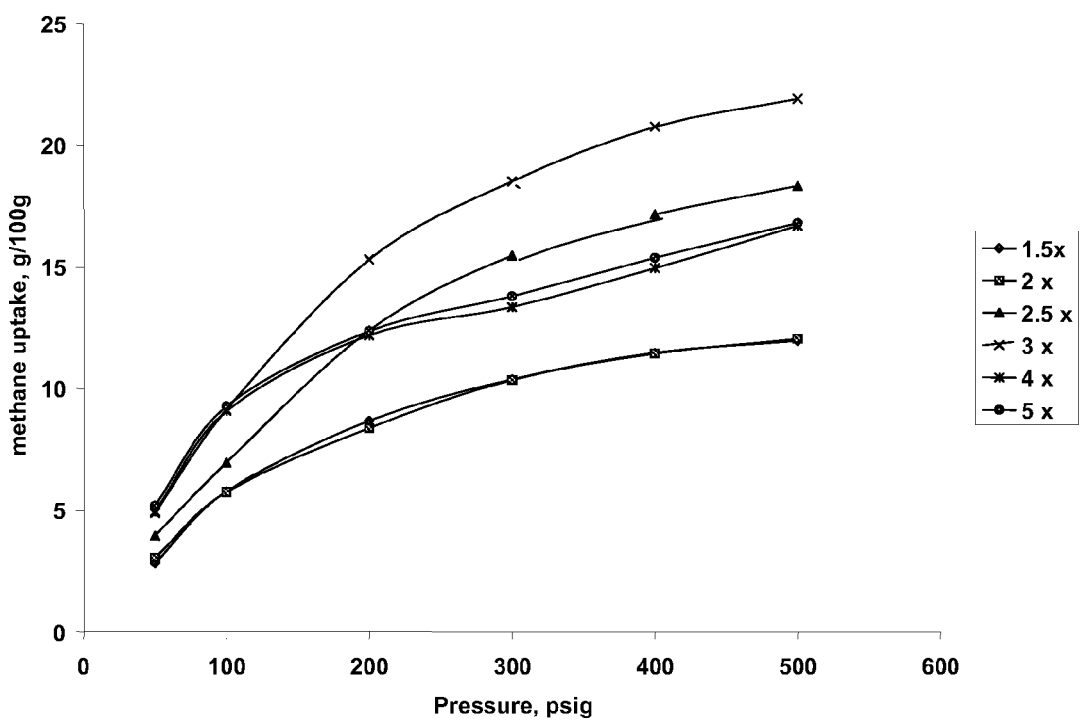
FIG. 4 shows gravimetric methane storage isotherms for activated carbon prepared with different rates of base treatment in the base activation step. Uptake is at 20° C.
Figure 5:
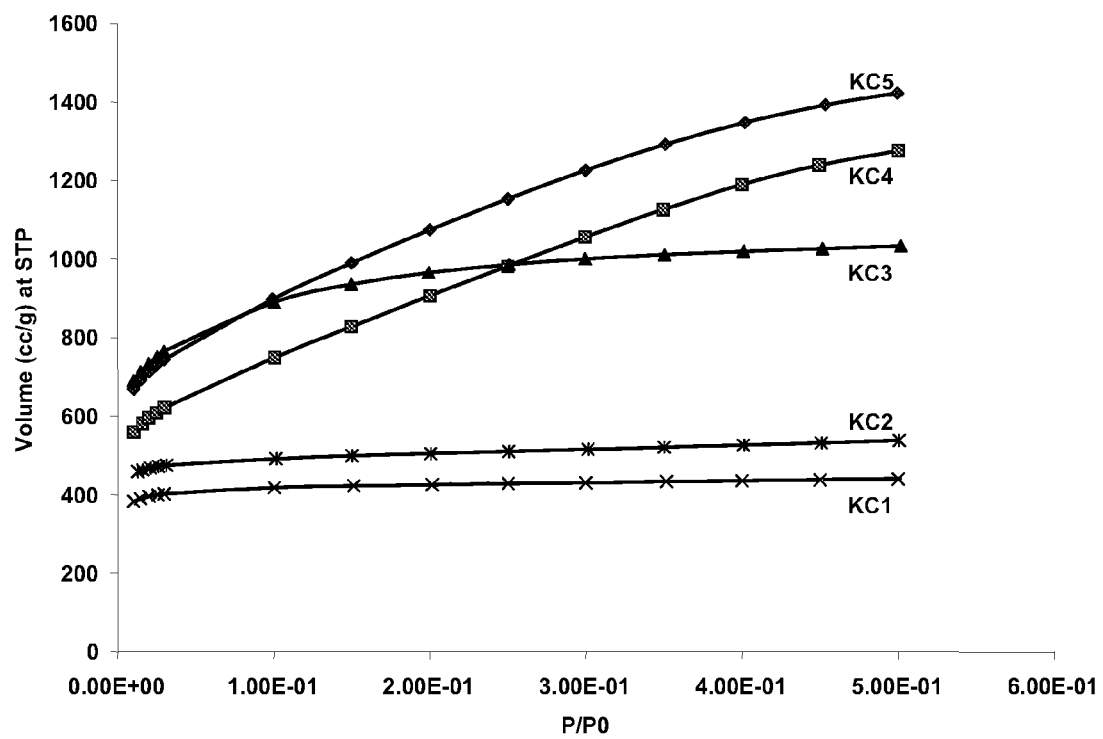
FIG. 5 shows nitrogen isotherms for activated carbon prepared at different rates of base treatment in base activation step. Uptake is at 77 K.

The KC-series demonstrates how KOH:char ratios in excess of 2.0 may be used to attain BET surface areas in excess of 3000 m²/g. Density decreased with increasing KOH:char ratios. Micropore volume decreased at KOH:char ratios greater than 3.0. The samples were activated at a temperature of 800° C. for 1 hour. The char used for this activation was soaked with 50% phosphoric acid at 50° C. for 8 hours, charred at 450° C., and heated to charring temperature at 1° C./min. FIGS. 3, 4, and 5 illustrate the impact of pressure (methane and nitrogen) on adsorption.

Figure 6:
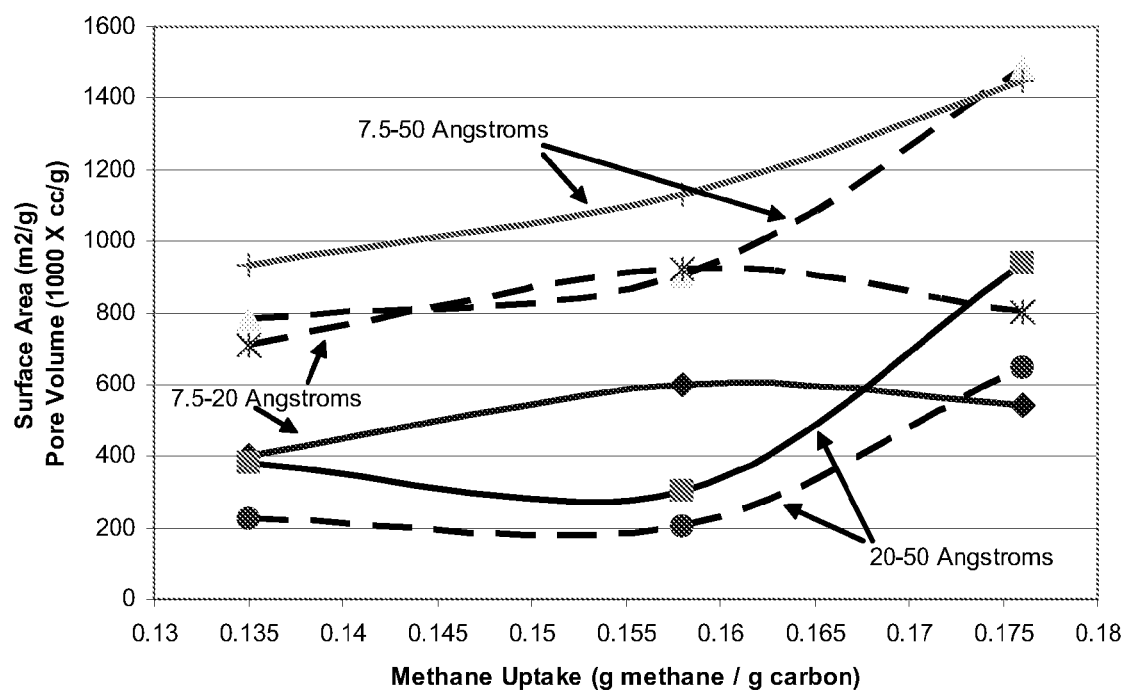
FIG. 6 is a graphic illustration of the impact of pore volume and surface area on methane adsorption.

The Ba-series re-evaluates the KOH:char ratios with an emphasis on methane uptake. Preparation conditions in addition to those listed in Table 7 included use of 20-40 mesh corn cob feed stock, a 24 hr soak time, heating at 1.5° C./min to the charring temperature, a 1.5 hr charring time, grinding to 40 mesh after charring, cooling overnight in the oven, and KOH activation at 790° C. for 1 hour. FIG. 6 graphically correlates the pore volumes and BET surface areas with methane uptake and conclusively demonstrates the importance of pores with diameters between 20 and 50 Å on excess methane adsorption. The greater the amount of KOH, the greater the amount of carbon lost as vapor during activation. Based on the correlation of FIG. 6, methane uptake for the embodiments of this invention correlated best with the volume of pores with diameters between 7.5 and 50 Å. This finding is different than literature assumptions and/or findings that do not consider pore diameters greater than 20 Å to be of prominence in providing methane uptake. Based on critical molecule diameters, pore volumes between about 6 and 30 Å are the most important for methane uptake at 500 psig and 20° C. Higher storage pressures would make more effective use of the larger pore diameters.

The KOH-HTT-series demonstrates the impact of activation temperature on activated carbon properties. The acid soak was for 8 hours and was heated to charring temperature at 1° C./min. Density decreased with increasing activation temperatures. A maximum in activated carbon BET surface area and total pore volume corresponded to an activation temperature near 850° C. Combined, the optimal values of the critical parameters summarized in the tables define a path through which a biomass such as corn cobs may be converted to an activated carbon with BET surface areas in excess of 3000 m²/g.

TABLE 9

Results of parametric study on activation conditions.

Impact of KOH:Char Ratio: KC-Series

| BET Surface Area | Micropore Volume | Mesopore Volume | Total Pore Volume | Particle Density | Methane Uptake |
|---|---|---|---|---|---|

TABLE 9-continued

Results of parametric study on activation conditions.

| Sample | KOH × C | $m^2/g$ | cc/g | cc/g | cc/g | g/cc | V/V |
|---|---|---|---|---|---|---|---|
| KC1 | 1.5 | 1314 | 3.38E−01 | 0.21 | 0.55 | 0.74 | 135 |
| KC2 | 2 | 1724 | 4.90E−01 | 0.19 | 0.68 | 0.69 | 128 |
| KC3 | 3 | 2997 | 1.16E+00 | 0.66 | 1.72 | 0.47 | 159 |
| KC4 | 4 | 3347 | 5.14E−01 | 1.68 | 2.03 | 0.37 | 96 |
| KC5 | 5 | 3837 | 1.52E−01 | 1.86 | 2.01 | 0.33 | 85 |

Impact of KOH:Char Ratio: Ba-Series

| Sample | Methane Uptake Corrected for Void Space (g/100 g carbon) | Methane Uptake (V/V) | Ratio of KOH:Char used in Preparation (g:g) | Ratio of Activated Carbon Produced to Char Consumed |
|---|---|---|---|---|
| Ba-5.1 | 13.5 | 132 | 2 | 0.556 |
| Ba-5.2 | 15.8 | 150 | 3 | 0.452 |
| Ba-5.31* | 17.6 | 163 | 4 | 0.374 |
| Ba-5.32 | 19.7 | 179 | 4 | 0.398 |
| Ba-5.4 | 16.8 | 157 | 5 | 0.402 |

*Ba-5.31 was prepared without a nitrogen purge during most of the activation step.

Impact of Activation Temperature: KOH-HTT-Series

| Sample | Activation T °C. | BET Surface Area $m^2/g$ | Micropore Volume cc/g | Mesopore Volume cc/g | Total Pore Volume cc/g | Methane Uptake V/V | Piece Density g/cc |
|---|---|---|---|---|---|---|---|
| KOH-HTT1 | 700 | 1988 | 8.19E−01 | 0.31 | 1.14 | 156 | 0.60 |
| KOH-HTT2 | 750 | 3175 | 1.29E+00 | 0.49 | 1.78 | 156 | 0.58 |
| KOH-HTT3 | 800 | 2997 | 1.16E+00 | 0.66 | 1.82 | 159 | 0.47 |
| KOH-HTT4 | 850 | 3421 | 3.39E−01 | 1.82 | 2.16 | 140 | 0.40 |
| KOH-HTT5 | 900 | 2932 | 0.5E−01 | 1.80 | 1.85 | 139 | 0.35 |

Example 4

Control Studies with Darco Carbon

The commercial carbons Darco G-60 (24, 227-6, a 100 mesh carbon) and Darco B (27, 810-6) were evaluated for comparison to the carbons of this invention and were prepared in accordance to the carbons of this invention. These commercial products had particle sizes of 100-325 mesh and reported BET surface areas of 600 and 1500 $m^2/g$, respectively.

The Darco G-60 was activated at KOH:carbon ratios of 0, 2, 2.25, and 2.5 under nitrogen flow at 790° C. After the activation each sample was washed in a Buchner funnel until neutral. The respective excess adsorption (g/kg) was 22.2, 85.2, 63.4, and 28.2. The respective bulk densities were 0.149, 0.206, 0.300, and "unknown", respectively. The Darco B product adsorbed methane at 57.4 g/kg.

By comparing the surface areas of the Darco products without further treatment, these data indicate that surface area, alone, does not lead to high methane storage capabilities. These data also illustrate how a carbon made from a feed stock other than corn cobs can be transformed to a material adsorbing more than 5% methane by weight. These data also illustrate how the treatment of a relatively high surface area carbon can be further enhanced with KOH treatment.

Example 5

Demonstration of Adsorption of Copper Cations for Water

The carbon materials of this invention were evaluated for their ability to remove metals from water. Distilled water was additized with about 9 mg/l copper cations. Emission spectroscopy was performed on this mixture as reported by the Blank sample of Table 10. Equal masses of 5 carbons were mixed with this stock solution to remove the copper. Two commercial products (Calgon and Darco) were tested with results as reported. The last three samples listed in Table 10 are samples prepared by the processes of this embodiment. The best adsorption was demonstrated by the KC4 sample (see Table 9). This example illustrates the effectiveness of the activated carbons of this invention for adsorbing metals from water-especially the materials with greater than 45% of their pore volume in the 20-50 Å diameter range and with total pore volumes greater than 2.0 cc/g.

TABLE 10

Data on Adsorption of Copper Cations from Water.

| Sample | Absorbance value | Concentration mg/L | pH of Solution |
|---|---|---|---|
| Blank | 2.9 | 8.99 | 7 |
| Calgon-T | 2.1 | 6.23 | 5-6 |

TABLE 10-continued

Data on Adsorption of Copper Cations from Water.

| Sample | Absorbance value | Concentration mg/L | pH of Solution |
|---|---|---|---|
| Darco-T | 0.15 | 0.15 | 6-7 |
| S-22-T | 0.4 | 0.88 | 6-7 |
| KC4-T | 0.11 | 0.04 | 6-7 |
| Lab C-T | 0.24 | 0.41 | 6-7 |

Example 6

Demonstration of Supporting Catalyst on Activated Carbon

It is known that metals such as Pt, Cu, Pd, Cr, Ni, etc. can be supported on carbon. In order to demonstrate the effectiveness of highly porous carbon based disc catalyst, which will act as nano-scale flow device, copper chromite catalyst was selected for demonstration and further study.

The conditions of this reaction were within the range where they will not cause the gasification of the carbon support of the catalyst. Table 11 shows some of the preliminary data on the conversion of glycerin to propylene glycol using carbon supported copper chromite catalyst in powder-form carried out in plug flow reactor. It also shows the comparison between the conversions and productivities for the conventional copper chromite catalyst and the copper chromite catalyst supported on activated carbon. The reaction was conducted at 220° C., and the hydrogen to glycerin mole ratio was about 20:1. Catalyst 1 and Catalyst 2 are catalysts supported on highly porous carbon (similar to the KC3 of Table 7) with different metal loadings.

TABLE 11

Comparison of Commercial Catalyst and Catalyst Supported on Activated Carbon of the Invention.

| Catalyst | Amt of catalyst (g) | Conversion | Productivity ($g_{PG}/g_{catalyst}$) |
|---|---|---|---|
| Catalyst-1 | 1.00 | >99% | 1.02 |
| Catalyst-2 | 1.00 | >98% | 0.95 |
| Commercial | 10 | >99% | 0.16 |

Figure 7:
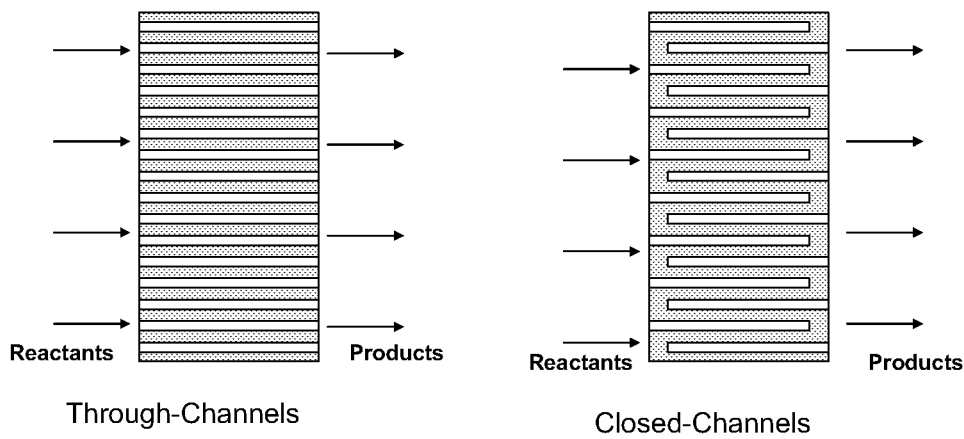
FIG. 7 illustrates two differed channel options to overcome pressure drops.
Figure 8:
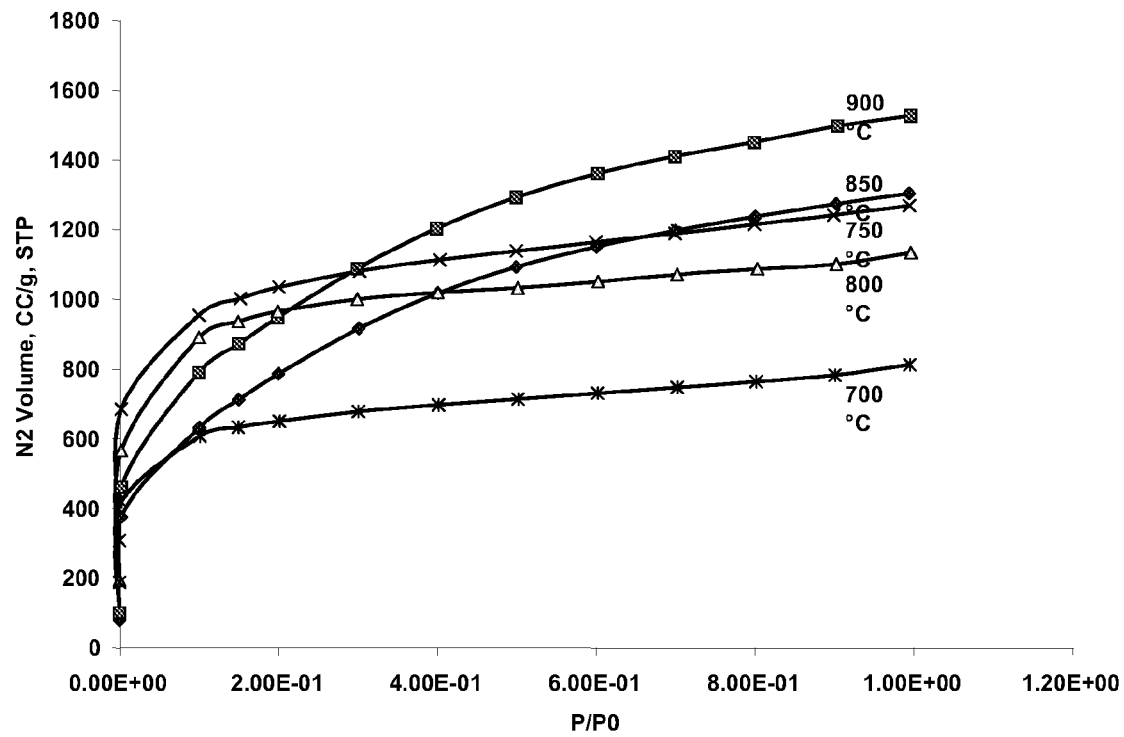
FIG. 8 shows nitrogen isotherms for activated carbon prepared at different temperatures of base activation. Uptake is at 77 K.
Figure 9:
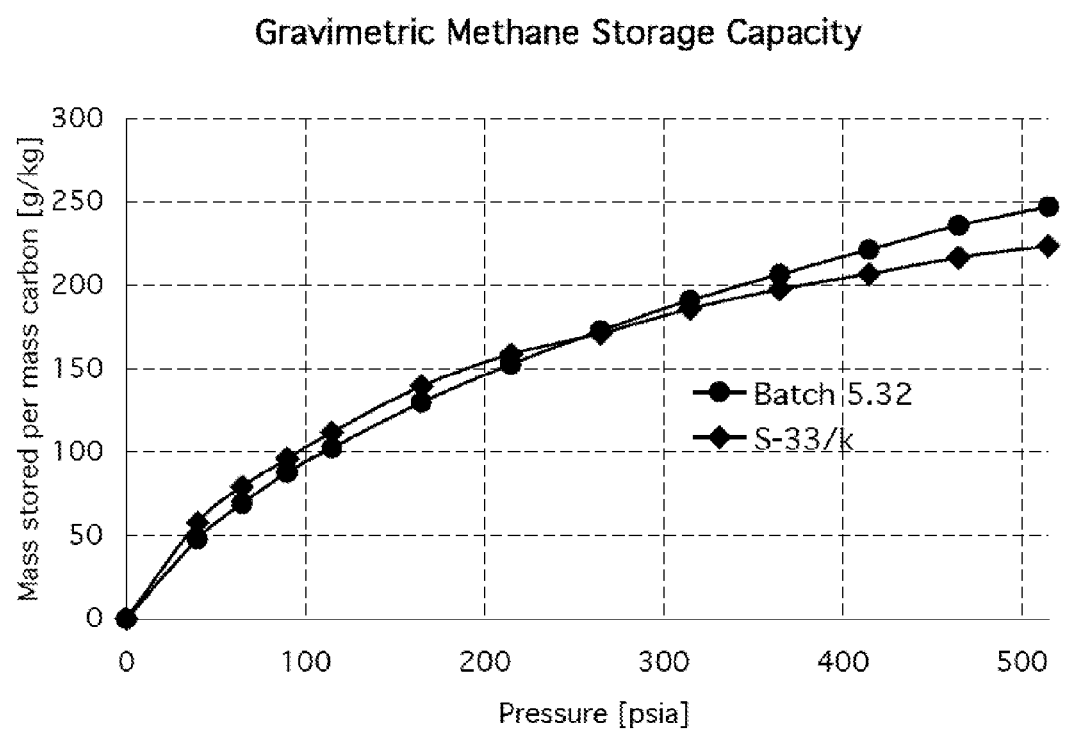
FIG. 9 shows high-performance gravimetric methane storage isotherms at 20° C. and illustrates that preferred embodiments of this invention are carbons with a large micropore volume and large mesopore volume (e.g., Ba5.32, Table 7) if the target is a minimum-weight methane tank.

The size of the metal particles on the carbon (observed with electron microscopy) was less than 20 nm, which shows that the metal particles can be deposited in micropores that constitute the large section of pore size distribution of the carbon. The conversion of glycerol to propylene glycol over copper chromite catalyst will result in product degradation if/when the reaction is carried out for times longer that that required to achieve an equilibrium conversion of propylene glycol and acetol. Due to this, the results (even though the are all over 98% conversion) do demonstrate that the low catalyst loading on the carbon is considerably more effective than the same commercial catalyst. Further increases in productivity are expected in the pressed discs with microreactor configurations. To promote even flow and reduce pressure drops channels are preferably incorporated in the pressed discs such as that illustrated by FIG. 7. The closed channel approach is preferred. One method of creating closed channels is to drill the channels into the briquette from the two opposite faces.

Example 7

Example Pore Size Distribution

Table 12 summarizes an example pore size distribution for a carbon prepared by a method similar to sample KC3 of Table 7.

TABLE 12

Example summary of pore size and pore volume distributions.

| Width (nm) | To | (nm) | Volume [cc/g] | Area [m²/g] |
|---|---|---|---|---|
| 0.0 | | 1.00 | 0.4 | — |
| 0.79 | | 1.00 | — | 1398.1 |
| 1.00 | | 1.26 | 0.083 | 182.4 |
| 1.26 | | 1.58 | 0.161 | 283.9 |
| 1.58 | | 2.00 | 0.244 | 336.5 |
| 2.00 | | 2.51 | 0.234 | 259.1 |
| 2.51 | | 3.16 | 0.155 | 134.3 |
| 3.16 | | 3.98 | 0.135 | 95.4 |
| 3.98 | | 5.01 | 0.044 | 25.6 |
| 5.01 | | 6.31 | 0.072 | 31.2 |
| 6.31 | | 7.94 | 0.049 | 17.2 |
| 7.94 | | 10.00 | 0.039 | 10.7 |
| 10.00 | | 12.59 | 0.026 | 5.9 |
| 12.59 | | 15.85 | 0.019 | 3.4 |
| 15.85 | | 19.95 | 0.014 | 2.0 |
| 19.95 | | 25.12 | 0.010 | 1.1 |
| 25.12 | | 31.62 | 0.007 | 0.6 |
| Total | | | 1.71 | 2787.5 |

Example 8

Carbon Paste Capacitor

Activated carbon sample S-56 was evaluated for use in a carbon paste capacitor by methods known in the art. The capacitor performed better than several controls representative of some of the best available carbons for use in carbon paste capacitors. The good performance of S-56 is attributed to the high surface area made possible with a high pore volume in pores of diameter less than 10 Å.

Example 9

Hydrogen Storage

Hydrogen adsorption and storage was evaluated in Sample S-33/k at 77 and 300 K. At 500 psig, these samples reversibly adsorbed 70 and 10 g/kg ($H_2$:carbon) of hydrogen, respectively.

Example 10

Adsorption at Higher Pressures

Figure 10:
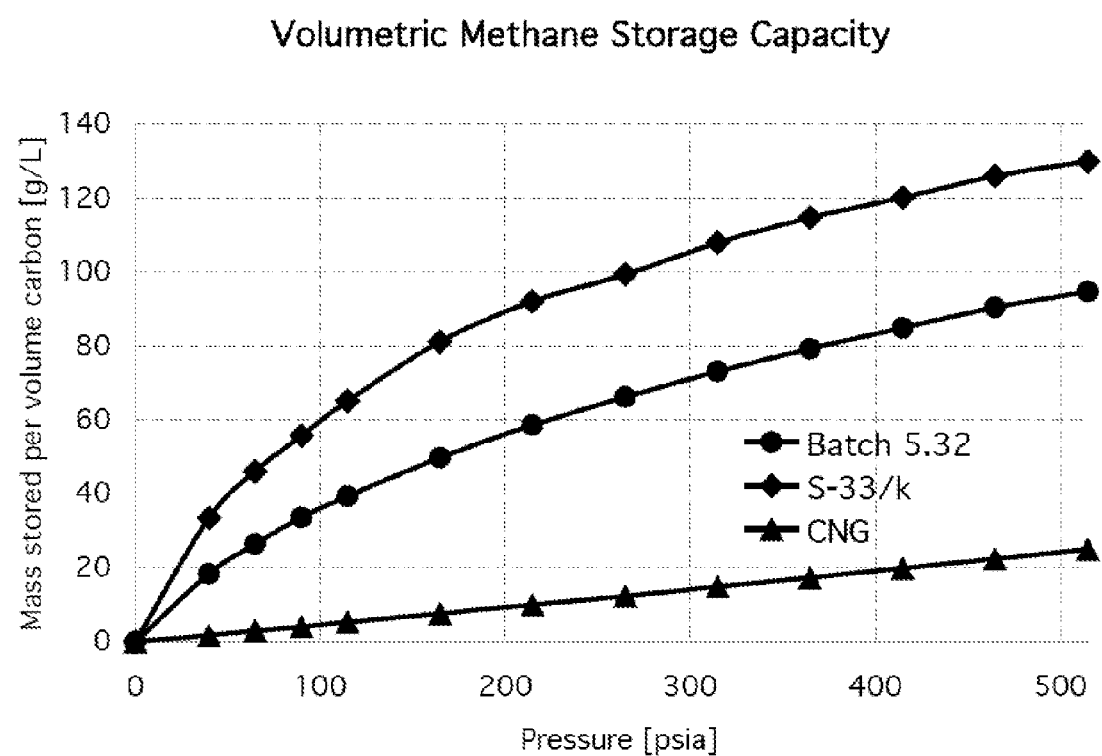
FIG. 10 shows high-performance volumetric methane storage isotherms at 20° C. and illustrates that preferred embodiments of this invention are carbons with a large micropore volume and a small mesopore volume (e.g., S-33/k, Table 7) if the target is a minimum-volume methane tank.

FIGS. 3, 4, 5, 8, and 9 illustrate the impact of pressure (methane and nitrogen) on adsorption. FIG. 10 illustrates an additional example of amount stored (total adsorption) for Ba5.32 and S-30 samples.

An advantage of adsorbed natural gas (ANG) storage is to be able to store gas at lower pressures. The principal advantage of ANG storage is to be able to store more gas at the same pressure, relative to storage in the same tank without adsorbent (shown as compressed natural gas, CNG, in FIG. 10). When using ANG at higher pressures, the preferred carbons have isotherms with higher positive slopes on the isotherms at 500 psig, which indicates that higher pressures continue to increase total adsorption. Several embodiments of this invention are particularly good for ANG storage at higher pressures, especially those like KC3 having pore volumes in excess of 1.1 cc/g in pores with diameters between 10 and 50 Å.

What is claimed is:

1. An activated carbon adsorbent, wherein the adsorbent comprises a total pore volume from about 1.5 cc/g to about 2.37 cc/g, a surface area of from about 2700 m$^2$/g to about 3421 m$^2$/g, a particle size of at least 149 microns, a pore volume from about 1.5 cc/g to about 2.00 cc/g for pores with diameters less than about 50 Å, and a pore volume from about 0.8 cc/g to about 1.13 cc/g for pores with diameters ranging from about 20 Å to about 50 Å.

2. The adsorbent of claim 1, wherein the adsorbent comprises a methane gravimetric storage capacity of greater than about 200 g/kg at a temperature of about 20° C. and a pressure of about 500 psig.

* * * * *